Nov. 1, 1955  K. J. HASH  2,722,181
CONDUIT PLACING MACHINE
Filed Feb. 26, 1953  2 Sheets-Sheet 1

Inventor
K. J. Hash
By Arthur H. Sturges
Attorney

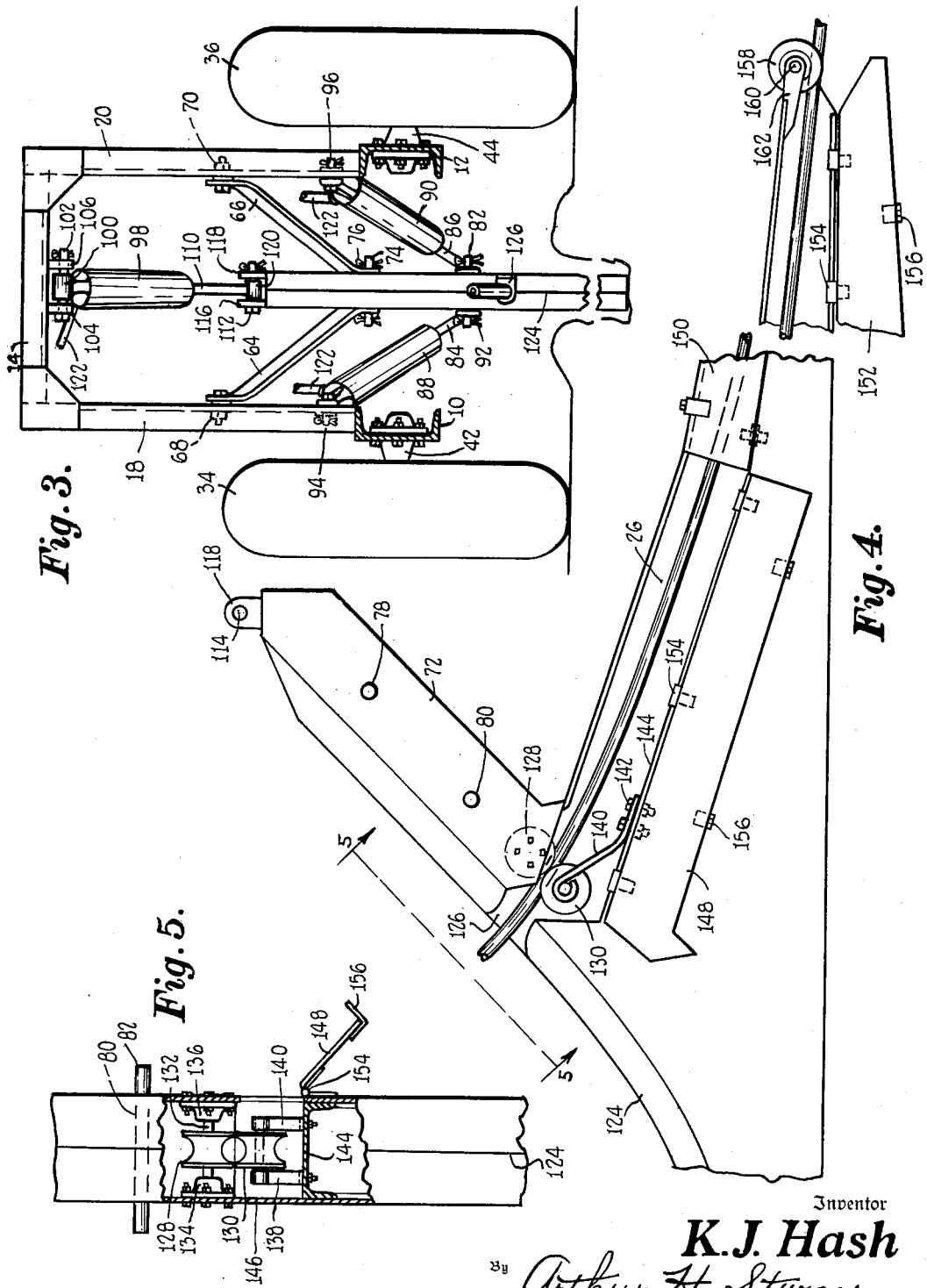

United States Patent Office 2,722,181
Patented Nov. 1, 1955

2,722,181
CONDUIT PLACING MACHINE

Kent J. Hash, Genoa, Nebr.

Application February 26, 1953, Serial No. 339,000

3 Claims. (Cl. 111—5)

This invention relates to machines of the type used for digging ditches or opening trenches, and in particular a machine having a horizontally disposed chassis or frame with a plow for opening a trench mounted in the frame with a combination of links and hydraulic cylinders or jacks which connect a horn extended upwardly from the plow to the frame, with a channel having hinged doors in one side extended longitudinally through the plow for laying a wire, cable, conduit, tube or pipe in the trench, and having means for filling in the trench to cover a conduit or the like therein.

The purpose of this invention is to provide a machine for placing conduit or the like in the ground in which the conduit or the like is deposited in the ground and covered with a continuous operation eliminating the necessity of splicing the conduit or the like in the laying operation.

Various types of machines have been provided for laying wires, cables, conduit, tubing, pipes and the like, however, with conventional types of machines it is difficult to position the conduit or the like on the ground and thread it through the machine, and it is also difficult to lay conduit and the like continuously from a large spool or reel. For this reason the conventional method of laying conduit or the like is to place the conduit in the ground in comparatively short lengths and splice the lengths together. This is difficult when a cable contains a plurality of strands.

With this though in mind this invention contemplates a machine for laying conduit and the like in which the conduit is threaded through a ditch or trench digging plow and over a tractor to which the machine may be attached, and wherein the plow is actuated by hydraulic jacks and one side of a channel through which the conduit is fed into the ground is provided with hinged doors that are adapted to open to remove and replace the conduit.

The object of this invention is, therefore, to provide a machine for placing conduit and the like in the ground in which the conduit is threaded through the machine whereby the machine is adapted to actuated with a continuous operation.

Another important object of the invention is to provide a machine for placing conduit and the like in the ground in which a plow or sledge that opens a trench for the conduit is adjustable, and the position thereof is controlled by hydraulic means.

Another object of the invention is to provide a machine for placing conduit and the like in a trench in which the distance the conduit is positioned from the surface of the ground is adjustable.

A further object of the invention is to provide a machine for laying conduit, or the like, in a trench which is also provided with means for filling the trench after the conduit is placed therein.

A still further object of the invention is to provide a conduit placing machine in which the conduit is carried into the ground with a plow having a longitudinally disposed conduit feeding channel therein, and in which one side of the channel is provided with hinged doors to provide inspection of the interior thereof.

And a still further object is to provide a machine for placing conduit and the like in the ground in which the machine is in the form of an attachment for a tractor, and in which the attachment is of a simple and economical construction.

With these and other objects and advantages in view the invention embodies a horizontally disposed frame providing a platform and having longitudinally positioned side beams connected by transverse bridge structures, a plow connected by links and hydraulic jacks to the bridge structure on the forward end of the frame, a conduit feeding channel extended rearwardly through said plow, and a roller in combination with mold-boards carried by the frame and positioned above the trailing end of the plow for filling in and covering a trench formed by the plow and in which a conduit has been placed.

Other features and advantages of the invention will appear from the following description taken in connection with the drawings, wherein:

Figure 3 is a cross section through the attachment, taken on line 3—3 of Figure 1, with the parts shown on an enlarged scale, and illustrating the mounting elements of the plow.

Figure 4 is an elevational view showing the intermediate portion of the plow with the parts shown on an enlarged scale, with parts broken away and other parts omitted, and with some of the doors of the conduit carrying channel in the open position.

Figure 5 is a section taken on line 5—5 of Figure 4 showing the face of the plow with parts broken away to show the guide rollers for feeding the conduit into the channel.

Figure 2:
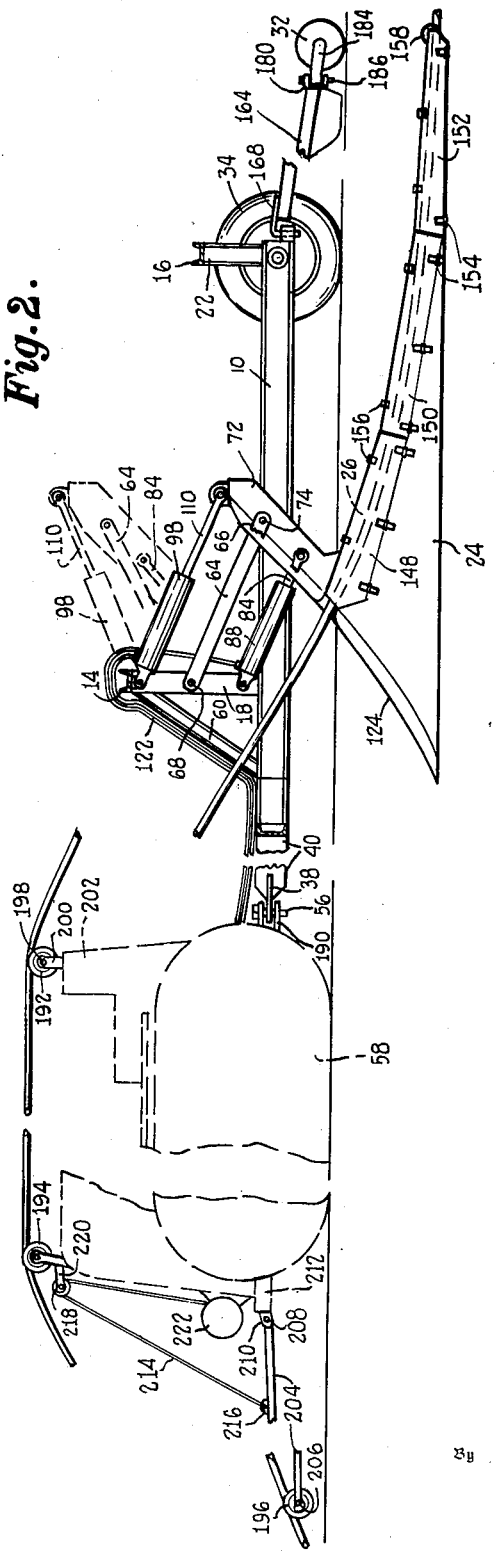
Figure 2 is a longitudinal section through the attachment taken on line 2—2 of Figure 1, showing the attachment with the forward end connected to a tractor, which is shown in broken lines, with the plow and conduit carrying channel extended into the ground in the operative positions, with the conduit extended over the tractor, and with parts broken away.
Figure 1:
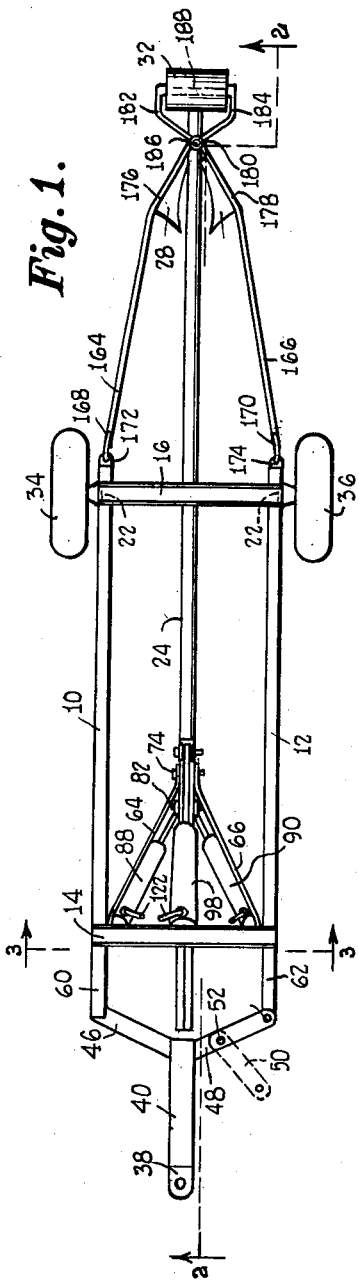
Figure 1 is a plan view showing the conduit laying attachment.

Referring now to the drawings wherein like reference characters denote corresponding parts the conduit laying or placing attachment of this invention includes a substantially horizontally disposed frame having side beams 10 and 12 connected with bridge or U-shaped cross members having upper channel bars 14 and 16, the channel bar 14 being supported by vertical channel or side bars 18 and 20, and the channel bar 16 by similar channel bars 22, a plow 24 positioned in the center of the frame and having a longitudinally disposed channel 26 extended rearwardly therethrough, mold-boards 28 and 30 for filling a trench formed by the plow extended from the trailing end of the attachment, a covering roller 32 following the mold-boards, and supporting wheels 34 and 36 journaled on the rear portion of the frame, the forward end of the frame being adapted to be supported by a towing tractor by means of a tongue 38 and a draw-bar 40.

The wheels 34 and 36 are journaled on the side beams 10 and 12, which are preferably channel irons, with bearings 42 and 44, which are bolted to the beams, as shown in Figure 3, and the draw-bar is connected to the forward ends of the beams with struts 46 and 48. The strut 48 is provided with a hinged section 50 that is pivotally connected to the strut with a bolt 52, at one end, and to the end of the beam 12, at the opposite end, with a bolt 54. The tongue 38 extends from the forward end of the draw-bar and the tongue is provided with an opening positioned to receive a draw-pin 56 of a towing tractor, as indicated by the numeral 58.

The forward cross member is supported by diagonal braces 60 and 62 from the forward end of the frame, and the plow 24, which is suspended from the forward cross member is held by links 64 and 66, the upper ends of which are connected to the vertical bars 18 and 20 with bolts 68 and 70, respectively, and the lower ends of which are connected to the upper section or horn 72 of the plow with a pin 74 having cotter pins 76 in the ends thereof. The pin 74 is positioned in an opening 78 in the horn, and a similar opening 80 is also provided in the horn for a pin 82 on the ends of which connecting rods 84 and 86, of hydraulic cylinders 88 and 90 are secured by cotter pins 92. The upper ends of the cylinders 88 and 90 are secured to the vertical bars 18 and 20 with bolts 94 and 96.

The upper end of the horn is held and controlled by an upper hydraulic jack 98, the base of which is provided with a hub 100 that is mounted on a bolt 102 which extends through ears 104 and 106 that extend downwardly from the upper channel bar 14, and the lower end of the connecting rod 110 of the jack 98 is pivotally connected to the plow by a bolt 112 which extends through openings 114 in lugs 116 and 118 on the upper end of the horn. The end of the connecting rod 110 is provided with a hub 120 through which the bolt 112 extends.

The cylinder of each of the hydraulic jacks is provided with a hose connection, as indicated by the numeral 122, and the hose connections extend to conventional oil pumps of towing tractors, or other means for supplying fluid under pressure, and the fluid supplying means is provided with conventional valves for supplying the fluid to the individual cylinders as desired, and also for varying the pressure to the cylinders independently. By this means the plow may be moved from the position shown in full lines in Figure 2, to the position shown in dash lines, or to intermediate positions, depending upon the soil and the depth to which it is desired to place the conduit.

The forward edge of the plowshare or blade is V-shaped providing a soil parting or cutting edge 124, and the forward edge is provided with an opening or throat 126 that leads to feed rollers 128 and 130 which feed the conduit into the channel 26. The upper roller 128 is mounted in a fixed position, being held on a shaft 132, the ends of which extend into bearings 134 and 136 that are secured by bolts to the sides of the plow. The lower roller 130 is journaled in springs 138 and 140 which are secured by bolts 142 to the base 144 of the rear portion of the plow.

One side of the rear portion of the plow is provided with a stationary wall 146 and the other side is formed with doors 148, 150, and 152, that are hinged to the base 144 with hinges 154, and the extended edges of the doors are provided with latches 156. The trailing end of the trough is provided with a roller 158 which is journaled by a shaft 160 in bearings 162 mounted in the end of the channel and positioned to hold the conduit downwardly in the channel as it is placed in the trench.

The mold-boards 28 and 30 and the covering roller 32 are carried by a trailer having converging side bars 164 and 166, on the forward ends of which are hooks 168 and 170 that extend into sockets 172 and 174, respectively, on the trailing ends of the side beams 10 and 12 of the frame of the attachment. The side bars 164 and 166 are provided with sections 176 and 178 at the rear from which the mold-boards 28 and 30 depend, and the sections 176 and 178 meet at the center of the trailer at which point they are connected to a vertically positioned bearing 180. A bracket having outwardly diverging arms 182 and 184 is pivotally mounted in the bearing 180 with a pin 186 and a shaft 188, on which the roller 32 is journaled, is mounted in the extended ends of the arms 182 and 184.

By this means the mold-boards and roller are aligned with the plow and after the conduit or the like is placed in the trench formed by the plow the mold-boards scoop the soil back into the trench and the roller packs the soil therein.

With this attachment connected by the draw-pin 56 to a clevis 190 at the rear of a tractor, such as the tractor 58 the conduit, cable, pipe, or the like is trained from the opening in the plow over guide rollers 192, 194, and 196, whereby the device is picked up from the ground, carried over the towing tractor, and fed through the plow and channel extending therefrom to the trench formed by the plow.

The roller 192 is journaled by a shaft 198 in lugs 200 on a backrest 202 of the seat of the tractor, and the roller 194 is mounted on the radiator of the tractor in a similar manner. The roller 196 is journaled in a bifurcated end of a boom 204 by a pin 206 and the boom is pivotally mounted, by a pin 208 between ears 210 on a front bumper 212 of the tractor. The elevation of the boom is controlled by a cable 214 which extends from an eye 216 on the boom, over a pulley 218 in a bracket 220, and to a winch 222 on the tractor.

With this method comparatively large conduit or pipe may be placed in the ground, and it will be understood that where the attachment is used for small conduit, that is adapted to be coiled, a spool, reel, or drum on which conduit is wrapped may be carried at the rear of the tractor and fed directly into the plow.

In starting the conduit laying operation, particularly with large conduit or pipe, the conduit or pipe is stretched out on the ground or across a field, and with the doors of the channel 26 open, as illustrated in Figure 4, the conduit or pipe is trained through the attachment. At this time the plow is in the upper position, as indicated by the dash lines in Figure 2, and as the tractor is started the lower cylinders 88 and 90 are retracted and the upper cylinder 98 extended whereby the plow moves from the position shown in dash lines to the position shown in full lines, and the depth of the plow is readily adjusted by regulating the fluid supplied to the cylinders.

After completing the conduit laying operation the conduit is removed from the rollers above the tractor and, by opening the doors in the side of the channel the conduit is removed from the plow, and connection to the conduit or pipe may be made in the conventional manner. By this means conduit may be placed in the ground with a continuous operation so that the necessity of splicing conduit at intervals is eliminated.

From the foregoing description it is thought to be obvious that an attachment for laying conduit and the like constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A conduit feeding plow comprising a plowshare having a soil parting blade at the forward edge with a horn extended upwardly from the upper part of the blade and having an elongated trailing section with a channel extended longitudinally therethrough, means for closing the open side of the channel, a horizontally disposed frame carried by wheels on the trailing end and having a hitch on the leading end, a forward cross member having vertically disposed side bars extended upwardly from said frame and spaced forwardly from said plow, a pair of links pivotally mounted on the side bars of said cross member and pivotally connected to the horn of the plow, said links positioned in a horizontally disposed plane, a pair of hydraulic cylinders positioned below and in a plane parallel to said links, said cylinders being pivotally connected to the side bars of said cross member of the frame and having connecting rods pivotally connected to said horn, a hydraulic cylinder connected to an upper channel bar of the cross member at one end and to the horn of the plow at the other, said hydraulic cylinder being positioned above said links and also in a plane parallel to the plane in which the links are positioned, and conduit gripping rollers positioned in the channel of the plow, said cylinders having connections whereby fluid may be supplied thereto under pressure to adjust the position and elevation of the plow.

2. In a conduit laying plow, the combination which comprises a horizontally disposed frame having wheels on the trailing end and a hitch on the leading end, an inverted U-shaped forward cross member having an upper channel bar with spaced side bars positioned on the forward part of the frame, a plowshare having a soil parting blade at the forward edge with a horn extended upwardly from said blade and having an elongated trailing section, said plowshare having an elongated channel opening through one side extended from the leading edge to the end of the trailing section, a pair of links pivotally mounted on the side bars of the cross member and positioned with the extended ends thereof pivotally connected to the horn of the plow, said links positioned in a horizontally disposed plane, a pair of hydraulic cylinders pivotally connected at one of the ends thereof to the side bars of the cross member and having connecting rods pivotally connected to the horn, said cylinders being spaced below the links and positioned in a plane substantially parallel to the horizontal plane in which the links are positioned, a hydraulic cylinder spaced above a plane extended through the links and positioned with one end of the cylinder pivotally connected to the upper channel bar of the cross member and with a connecting rod of the cylinder pivotally connected to the upper end of the horn, and means for providing a cover for the open side of the channel extended longitudinally through the plowshare, said plowshare having a restricted throat opening into said channel, and the leading end of the channel having guide means therein.

3. In a conduit laying plow, the combination which comprises a horizontally disposed frame having wheels on the trailing end and a hitch on the leading end, an inverted U-shaped forward cross member having an upper channel bar supported by spaced side bars positioned on the forward part of the frame, a plowshare having a soil parting leading edge, a horn extended upwardly from the intermediate part, and an elongated trailing section, said plowshare having an elongated channel extended from the leading edge through the trailing section and opening through one side of the plowshare, a closure for said channel, said channel having a restricted throat at the leading end, said plowshare having a feed roller rotatably mounted in a fixed position therein and said feed roller extending into the upper part of the channel, a lower feed roller positioned in said channel, resilient means for mounting the lower feed roller whereby the lower feed roller is urged toward the fed roller in the fixed position, a pair of links pivotally mounted, at one of the ends thereof, on the side bars of the inverted U-shaped forward cross member and positioned with the other ends thereof pivotally connected to said horn of the plowshare, said links being positioned in a horizontally disposed plane, a pair of hydraulic cylinders also pivotally connected, at one of the ends thereof, to the side bars of the cross member and having connecting rods pivotally connected to the horn, said cylinders being spaced below the links and positioned in a plane substantially parallel to the plane in which the links are positioned, a hydraulic cylinder spaced above the plane extended through the links and positioned with one end of the cylinder pivotally connected to the upper channel bar of the cross member and with the end of a connecting rod extended therefrom connected to the upper end of the horn, said cylinders and links providing means for raising and lowering the plow and also for adjusting the position thereof, a trailer mounted on and extended rearwardly from the frame, mold-boards carried by the trailer and positioned to scoop soil into a trench formed by the plow, and a covering roller rotatably mounted in the trailing end of the trailer for packing the soil returned to the trench.

References Cited in the file of this patent

UNITED STATES PATENTS

| | | |
|---|---|---|
| 144,918 | Moore | Nov. 25, 1873 |
| 1,737,314 | Kirby | Nov. 26, 1929 |
| 1,863,671 | Pitts et al. | June 21, 1932 |
| 1,886,510 | Murphy | Nov. 8, 1932 |
| 1,886,511 | Gledhill | Nov. 8, 1932 |
| 2,118,553 | Garlinger | May 24, 1938 |
| 2,135,973 | Garlinger | Nov. 8, 1938 |
| 2,410,918 | Acton | Nov. 12, 1946 |
| 2,517,426 | Hall | Aug. 1, 1950 |
| 2,645,866 | McGee | July 21, 1953 |
| 2,649,746 | Taylor | Aug. 25, 1953 |
| 2,663,515 | Kinsinger | Dec. 22, 1953 |

FOREIGN PATENTS

| | | |
|---|---|---|
| 532,924 | Great Britain | Feb. 3, 1941 |
| 547,318 | Great Britain | Aug. 21, 1942 |
| 570,970 | Great Britain | July 31, 1945 |
| 613,577 | Great Britain | Nov. 30, 1948 |